(12) United States Patent
Wilson

(10) Patent No.: US 8,539,329 B2
(45) Date of Patent: Sep. 17, 2013

(54) METHODS AND SYSTEMS FOR WEB SITE CATEGORIZATION AND FILTERING

(75) Inventor: James Wilson, Fife (GB)

(73) Assignee: Bloxx Limited, Kirkton North (GB)

(*) Notice: Subject to any disclaimer, the term of this patent is extended or adjusted under 35 U.S.C. 154(b) by 895 days.

(21) Appl. No.: 12/447,899

(22) PCT Filed: Nov. 1, 2007

(86) PCT No.: PCT/GB2007/004186
§ 371 (c)(1),
(2), (4) Date: Nov. 6, 2009

(87) PCT Pub. No.: WO2008/053228
PCT Pub. Date: May 8, 2008

(65) Prior Publication Data
US 2010/0058204 A1   Mar. 4, 2010

Related U.S. Application Data

(60) Provisional application No. 60/865,553, filed on Nov. 13, 2006.

(30) Foreign Application Priority Data

Nov. 1, 2006   (GB) .................................. 0621752.5

(51) Int. Cl.
*G06F 17/26* (2006.01)
*G06F 17/27* (2006.01)

(52) U.S. Cl.
USPC .......................................... 715/200; 707/710

(58) Field of Classification Search
USPC .......................................... 715/200; 707/710
See application file for complete search history.

(56) References Cited

U.S. PATENT DOCUMENTS 6,266,664 B1 * 7/2001 Russell-Falla et al. ........ 707/700
6,704,698 B1 * 3/2004 Paulsen et al. .................... 704/1
(Continued)

FOREIGN PATENT DOCUMENTS

EP           1 742 177 A1      1/2007
WO      WO 02/091216 A1      11/2002
WO      WO 2005/036341 A2    4/2005

OTHER PUBLICATIONS

Gravano et al.. "Categorizing Web Queries According to Geographical Locality", ACM, 2003, pp. 325-333.*

(Continued)

*Primary Examiner* — James Debrow
(74) *Attorney, Agent, or Firm* — Jenkins, Wilson, Taylor & Hunt, P.A.

(57) ABSTRACT

Methods for configuring website categorization software, categorizing websites and a method and system for controlling access to websites. A number of websites are selected, all of which relate to a single predetermined category of subject matter. In order to create a category profile, a website is selected from the set (3), the website markup language is read (5), page content information extracted (7) and then analyzed (9). The system may then check whether it has analyzed a sufficient number of websites to allow for a reliable categorization of subsequent websites (13). Individual websites are categorized by extracting their page content information (45) and categorizing (51) on the basis of the degree of similarity between the information and the category profile (55). To control access, the system compares a website identifier with the database of categorized identifiers.

16 Claims, 7 Drawing Sheets

(56) References Cited

U.S. PATENT DOCUMENTS

| | | | |
|---|---|---|---|
| 6,751,600 B1* | 6/2004 | Wolin | 706/12 |
| 7,392,474 B2* | 6/2008 | Chen et al. | 715/254 |
| 7,404,141 B1* | 7/2008 | Giljum et al. | 715/234 |
| 7,483,982 B2* | 1/2009 | Hegli et al. | 709/225 |
| 7,536,413 B1* | 5/2009 | Mohan et al. | 1/1 |
| 8,078,625 B1* | 12/2011 | Zhang et al. | 707/748 |
| 2003/0105863 A1* | 6/2003 | Hegli et al. | 709/225 |
| 2006/0149710 A1* | 7/2006 | Koningstein et al. | 707/3 |

OTHER PUBLICATIONS

International Preliminary Report on Patentability for International Application No. PCT/GB2007/004186 (May 5, 2009).

International Search Report for International Application No. PCT/GB2007/004186 (Nov. 24, 2008).

Lin et al., "Research of Web Pages Categorization," IEEE International Conference on Granular Computing, pp. 691-694 (Nov. 2, 2007).

Ceci et al., "Classifying Web Documents in a Hierarchy of Categories: A Comprehensive Study," Journal of Intelligent Information Systems, vol. 28, pp. 37-78 (Jan. 19, 2007).

Zhang et al., "Automatic Web Page Categorization using Principal Component Analysis," Proceedings of the $40^{th}$ Hawaii International Conference on System Sciences, pp. 1-10 (Jan. 1, 2007).

Wong et al., "Learning Web Categorization with Controlled Generation of Context Features," 2006 IEEE International Conference on Systems, Man, and Cybernetics, pp. 2960-2964 (Oct. 2006).

Kules et al., "Categorizing Web Search Results into Meaningful and Stable Categories Using Fast-Feature Techniques," pp. 210-219 (Jun. 2006).

Liu et al., "An Editor Labeling Model for Training Set Expansion in Web Categorization," Proceedings of the 2005 IEEE/WIC/ACM/ International Conference on Web Intelligence, pp. 1-7 (Sep. 19, 2005).

Ceci et al., "Hierarchical Classification of HTML Documents with WebClassll," ECIR 2003, pp. 57-72 (2003).

* cited by examiner

METHODS AND SYSTEMS FOR WEB SITE CATEGORIZATION AND FILTERING

PRIORITY CLAIM

This application is a 371 application of International Application No. PCT/GB2007/004186, filed Nov. 1, 2007, which claims the benefit of U.S. Provisional Patent Application Ser. No. 60/865,553, filed Nov. 13, 2006 and British Patent Application No. 0621752.5, filed Nov. 1, 2006.

The present invention relates to methods and systems for web site categorisation and filtering and in particular to a method for automatic categorisation of web sites.

BACKGROUND TO THE INVENTION

The term web filtering is used to describe the process by which companies restrict or monitor their employees' internet use. Web filtering is achieved by a number of simple and complex means, the key types are described below.

Firms without any web filtering solution in place have an ability to read the URL requests from users from logs stored on their "firewall". This enables at least some review of access to take place, albeit after access to the website has occurred. This is labor intensive and inadequate in providing substantive proof that a particular user was responsible for the inappropriate access.

Black lists in software can list undesirable web addresses and prevent access to those sites. White lists list acceptable web addresses and are often used to restrict access to only those sites that are contained on the white list. The scale of the internet is such that maintenance of lists is a challenge and for users, it is very frustrating if you have a genuine reason or need to access a site but first must seek approval and have it included in allowed URLs.

In more sophisticated solutions, black and white lists are used to list "exceptions to the rule" for users. For example, a user may not be allowed access to travel sites but is provided access to low cost airline websites to book flights.

One well known web filtering technique is to provide a database of thousands or millions of web addresses. By manually examining each of these web sites and categorizing the content on the web pages, it is possible to create "user profiles" whereby various levels of staff can get controlled access to the internet. This (together with reporting) means that one user may get no access to the internet, a call center worker may only have access to a single web site, a secretary has access to travel sites but not shopping and a manager has more general access with the exception of inappropriate sites such as illegal/violent/racist/pornographic etc.

The demand for this type of approach has created a small number of database builders who typically invest heavily to maintain and grow their URL lists. Many thousands of URLs can be initially "harvested" using a variety of means, but manual categorisation is still predominantly used to ensure accuracy of categorisation.

Manual categorization requires each URL reviewer to read the content/look at images on the website, decide the kind of web site it is and categorize it in their database accordingly. The accuracy of this approach is variable—it is relatively easy to spot a pornography web site for example, but less easy to identify anonymous proxy sites.

With limited time available to categorise each site, any web site that deliberately seeks to mislead the casual review of a web site (e.g. a cookery site which when examined thoroughly turns out in fact to be pornography) can easily be successful in having the inappropriate address categorised as legitimate. Misclassifications are extremely frustrating for users and are a source of conflict between suppliers and clients.

A typical URL classifier will review some hundreds of web addresses daily. However, the Internet is said to be growing by something in the region of 7.5M new or re-named web sites each day across the world. Manual categorization typically classifies 500 web sites per person per day. Therefore, 15000 classifiers would be required to classify these websites. The cost of employing such a large number of staff would be considerable.

Companies who offer web filtering services advertise their services on the basis of the size of their database of categorized sites. It is usual for these databases to contain 15 to 17 million categorized sites. In the context of the overall web, these numbers are inconsequential and where users seek a URL not listed in the URL database, they will access the web site, whatever the content. This is embarrassing for suppliers in this field, but also, in certain markets (e.g. youth, schools etc.) it is unacceptable.

In addition web filtering suppliers are not particularly motivated to re-check URLs previously categorized: a significant volume of sites either re-name themselves or cease being operational and to delete these from URL lists risks admitting to promoting a database which appears to be growing slightly, static or even declining. Therefore the claims of web filtering suppliers about database sizes require further inspection to reach any conclusion about their capability.

Image scanning is a useful (but not foolproof) means of blocking pornography from a client network. However it tends to be expensive and is not a stand alone solution to managing broad internet access policy.

Keyword Request Analysis examines the keywords being requested by the user either within the web address being sought or within a search engine. These vary in sophistication where used. It is possible to provide an ability for users to tailor keyword requests to ensure vertical market needs are addressed. An example of this would be a Building College whose previous system stopped students searching for wire strippers, road hardcore etc. Systems can be tuned by users to allow these specific phrases but prevent the searching of the word "strippers" alone.

Some products use "in line" page scanning. This works typically where the user has asked for a web address. Prior to the site being delivered to the user, the text on the web site is scored against pre-listed words (e.g. "gamble" "poker" "pontoons"). If the score adds up to a number above a certain threshold, the user could be denied access to the web site. The advantage of this approach is that the keyword scanning does not need to have previously identified the web site and categorized it. The disadvantage of this approach is that the scanning is only effective where the words listed are scored (i.e. if offensive words, expressions—in whichever language—are not listed, it will gain a low score and be allowed on the user PC). Additionally, keyword scanning (using the gambling example above) tends to only be able to differentiate say a gambling web site from a "help from gambling" web site if "good" words/combinations are listed and negate the score gained by the offensive word.

If the "good" words are not listed or used sufficiently often, perfectly reasonable sites (e.g. Health Education) can be wrongly blocked.

Finally, the scanning of web pages for keywords is most effective in a restricted range of web sites. Pornography is a good example, where much of the language used will be slang and unique to more offensive/inappropriate sites. It will not for example be able to differentiate whether a sports story is on a sports site or a news site.

Accordingly, there are a number of problems associated with current web filtering technologies.

Database products fall further behind as a result of the sheer size of increase in the internet every day. No supplier can invest in enough resources to match internet growth/amendment rates.

"English language" products with (predominantly) English language URL lists are proving ineffective against detecting inappropriate sites within our multi cultural society.

Black & White lists, URL lists, Keyword Request review and keyword page scanning all depend upon previously scoped defence mechanisms—where a web site does not fit in with previously scoped words, phrases, exceptions etc, the web filtering fails to be effective.

Keyword page scanning is most effective in web sites with an emphasis on unique language for a particular type of site—e.g. slang words on porn sites. The ability to identify mainstream web sites by keyword scanning is very much more limited and in some cases, completely ineffective.

It is an object of the present invention to provide an improved method of website categorization and filtering.

In accordance with a first aspect of the present invention there is provided a method for configuring website categorization software to automatically categorize websites from a predetermined category of website, the method comprising the steps of:
(i) identifying a website from the predetermined category;
(ii) reading a markup *language description of the website;
(iii) extracting page content information from the markup language description;
(iv) analyzing the page content information;
(v) repeating steps (i) to (iv) for n websites in the predetermined category; and
(vi) creating a profile for the website category based upon a combination of the results of analyzing the page content information of n websites.

SUMMARY OF THE INVENTION

Preferably, the step of analyzing the page content comprises analyzing text or tokens on the page.

Preferably, the step of analyzing text on the page comprises counting the frequency of use of different words on the page.

More preferably, the frequency of use of all words is counted.

Preferably, the step of analyzing the page content comprises extracting a predetermined number of the most frequently used words.

Preferably, the pattern of use of the most frequently used words is analyzed.

Preferably, the result of the analysis of words is stored in a word table.

The present invention is designed to produce patterns of words which characterize a specific type (category) of website.

Preferably, the method further comprises assigning a probability weighting to a word or combination of words, the probability weighting providing a likelihood that a word or combination of words is to be found on a predetermined category of website.

Preferably, the probability weightings are stored in a category table.

Preferably, the markup language is HTML.

In accordance with a second aspect of the invention there is provided a method of categorizing a website, the method comprising the steps of:
(i) identifying a website;
(ii) reading a markup language description of the website;
(iii) extracting page content information from the markup language description;
(iv) comparing the page content information with one or more web site category profiles; and
(v) categorizing the website on the basis of the degree of similarity between the profile and the extracted page content information.

Preferably, the web site category profile is created in accordance with the method of the first aspect of the invention.

Preferably, the step of analyzing the page content comprises analyzing the tokens or words on the page.

Preferably, the step of analyzing the words on the page comprises counting the frequency of use of different words on the page.

More preferably, the frequency of use of all words is counted.

Preferably, the step of analyzing the page content comprises extracting a predetermined number of the most frequently used words.

Preferably, the pattern of use of the most frequently used words is analyzed.

Preferably, the result of the analysis of words is stored in a word table.

Preferably, the method further comprises applying the probability weighting of the first aspect of the invention to a word or combination of words, the probability weighting providing a likelihood that a word or combination of words is to be found on a predetermined category of website.

Preferably, the probability weightings are stored in a category table.

Preferably, the markup language is HTML.

In accordance with a third aspect of the invention there is provided a method of controlling access to a website requested by a user, the method comprising the steps of:
comparing the web site identifier with a database containing web site identifiers in which the website identifiers are arranged in categories using the method of the second aspect of the invention;
granting or denying access to the website on the basis of the presence or absence of the website identifier in the database.

Preferably, the method further comprises applying a filter which determines which of the categories a user is permitted to access.

Preferably, the filter can be set to allow access to different categories of website for different users.

Preferably, the website identifier is a Uniform Resource Identifier or a Uniform Resource Locator.

Preferably, the method further comprises conducting a keyword check on the web site identifier.

Preferably, the method further comprises conducting active page scanning.

In accordance with a fourth aspect of the invention there is provided a system for controlling access to websites, the system comprising:
a database containing web site identifiers in which the website identifiers are arranged in categories using the method of the second aspect of the invention; communication means for transmitting a website identifier requested by a user to the database;
comparison means for comparing the website identifier requested by the user with the contents of the database such that access to the website is granted or denied on the basis of the presence or absence of the website identifier in the database.

Preferably, the system further comprises a filter which determines which of the categories a user is permitted to access.

Preferably, the filter can be set to allow access to different categories of website for different users.

Preferably, the website identifier is a Uniform resource Identifier or a Uniform Resource Locator.

Preferably, the system further comprises a keyword checker for conducting a keyword check on the web site identifier.

Preferably, the system further comprises an active page scanner.

In accordance with a fifth aspect of the invention there is provided a system for controlling access to websites, the system comprising:
a database containing web site identifiers in which the website identifiers are arranged in categories;
communication means for transmitting a website identifier requested by a user to the database;
comparison means for comparing the website identifier requested by the user with the contents of the database such that access to the website is denied on the basis of the presence of the website identifier in the database;
and
computer software loaded on a user's server, the computer software being adapted to execute the method of the second aspect of the invention where the website identifier requested by the user is not on the database in order to categorize the website and to grant or deny the user access to the website on the basis of the categorization.

Preferably, the computer software is adapted to send details of a categorized website to the database.

In this way, a user who is attempting to access a website in a category where the user does not have permission to access websites, acts to update the database. For example, users might be denied access to entertainment websites that relates to new films or music. A new website in this category will be well known to fans of the film or music, but might take some time to be categorized by a website categorization system. The present invention uses the attempted access by a fan to more rapidly categorize the website.

Preferably, the system further comprises a filter which determines which of the categories a user is permitted to access.

Preferably, the filter can be set to allow access to different categories of website for different users.

Preferably, the website identifier is a Uniform resource Identifier or a Uniform Resource Locator.

Preferably, the system further comprises a keyword checker for conducting a keyword check on the web site identifier.

Preferably, the system further comprises an active page scanner.

In accordance with a sixth aspect of the invention there is provided a computer program comprising program instructions to perform the method of the first aspect of the invention.

In accordance with a seventh aspect of the invention there is provided a computer program comprising program instructions to perform the method of the second aspect of the invention.

In accordance with an eighth aspect of the invention there is provided a computer program comprising program instructions to perform the method of the third aspect of the invention.

The present invention will now be described by way of example only with reference to the accompanying drawings in which.

The present invention provides a method and system for website categorization and filtering. The purpose of the present invention is to greatly enhance the efficiency and speed of website categorization by providing an automatic system and method for undertaking this task.

Accordingly, the various aspects of the present invention all relate in one form or another to the fundamental step of making categorisation of websites automatic.

Figure 1:
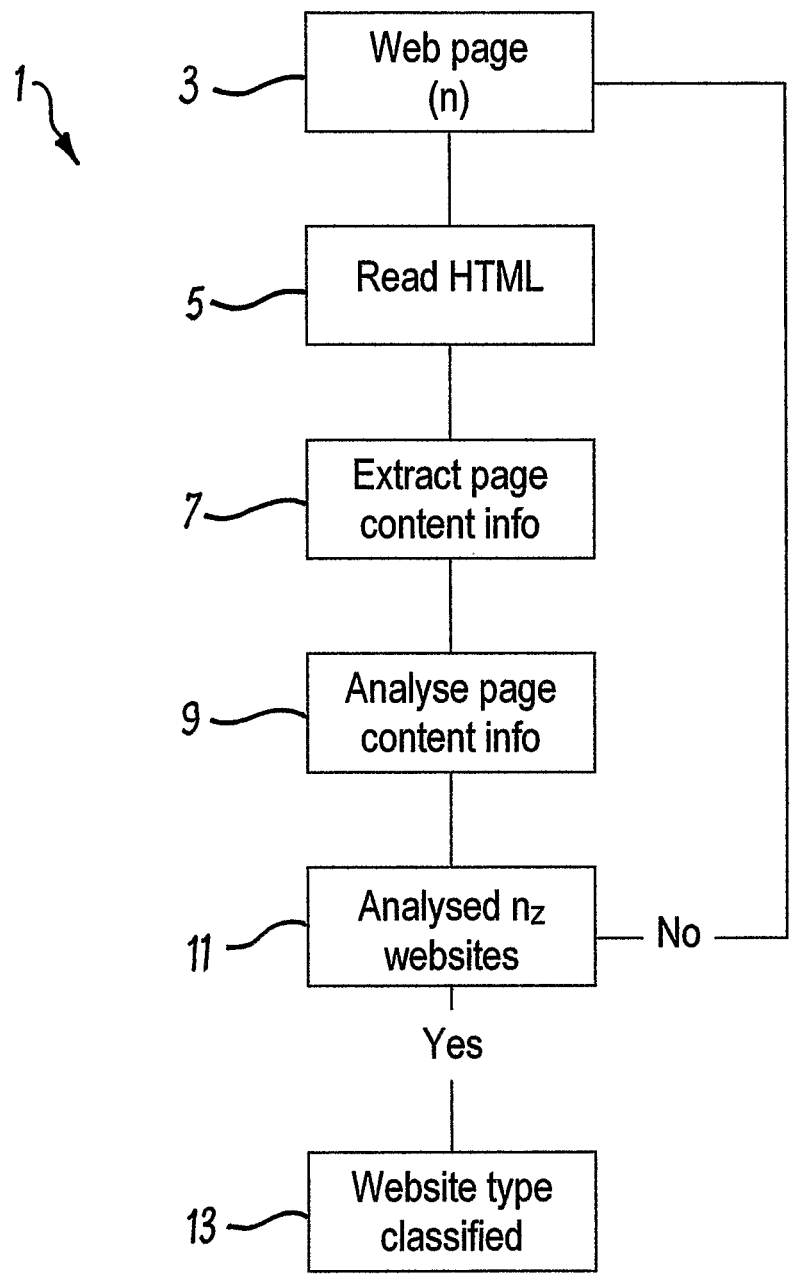
FIG. 1 is a flow chart showing a first embodiment of a method for configuring website categorization software by training the software to recognize certain categories of website.
Figure 2:
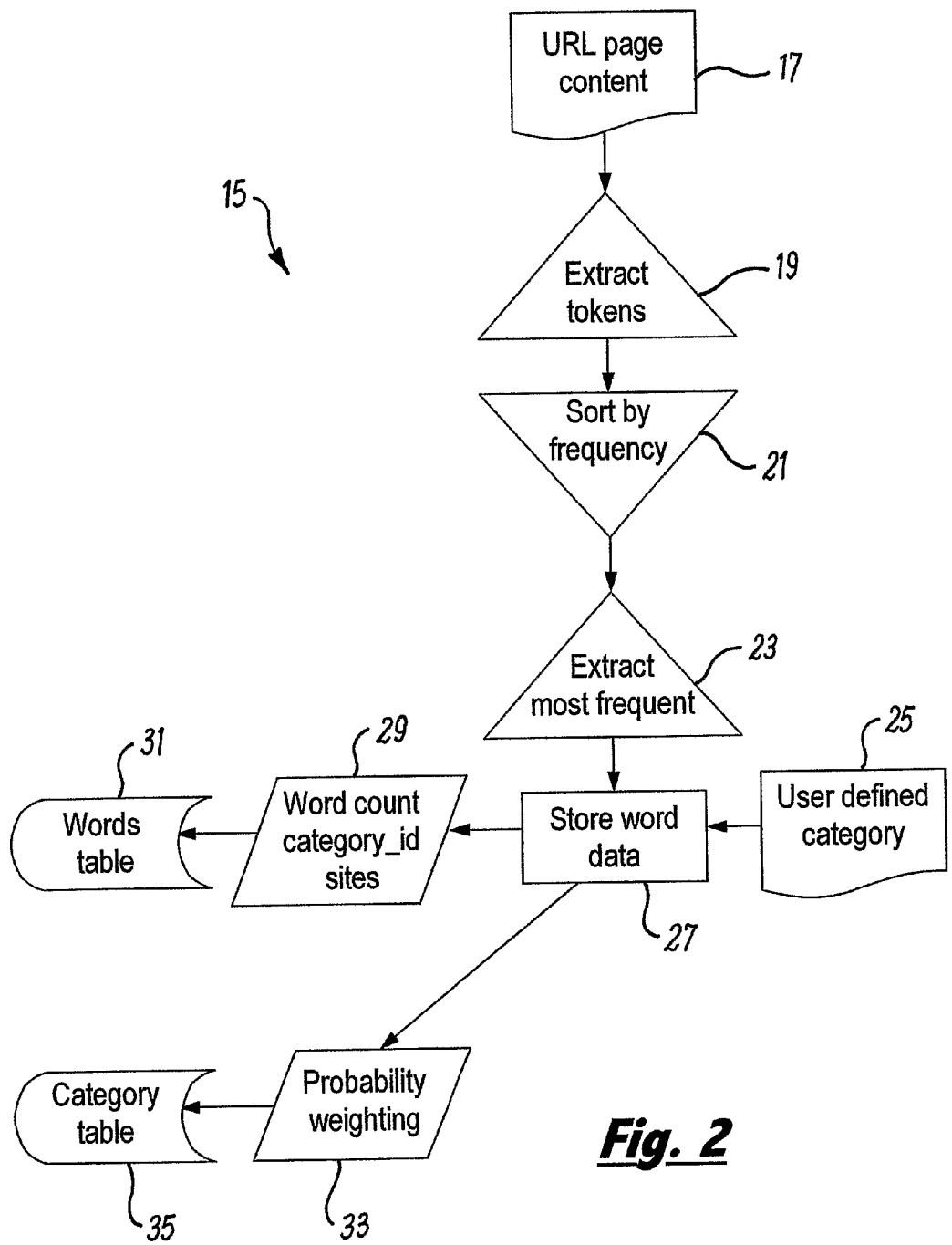
FIG. 2 is a second embodiment of the method for configuring website categorization software.

FIGS. 1 and 2 relate to an initial step in the present invention for training a computer system upon which the software written in accordance with the present invention can be trained to recognize different categories of website.

In order to train a system made in accordance with the present invention, a number of websites, for example 20, are selected, all of which relate to a single category of subject matter (for example, racist websites). A particular website 3 from the set is selected, the website html is read 5, page content information extracted 7 and then analyzed 9. Thereafter, the system may check whether it has analyzed a sufficient number of websites to allow for reliable categorization of subsequent websites 11. If the answer is no, then steps 3 to 9 are repeated with another website from the set, if the answer is yes then the website type is classified 13.

FIG. 2 provides a more detailed embodiment of the manner in which a system is trained.

Flowchart 15 shows the selection of URL page content 17 in which information relating to the content of the website is extracted from the markup language. This information may be in the form of tokens or words, a token being a single word. The content information is typically in the form of words or sentences that describe the content of the website or webpage. These words or sentences are then analyzed and sorted by frequency 21, such that a histogram or similar chart may be created to show the frequency of each word.

In this example, it is useful to ensure that not only nouns and verbs are categorized but also that conjunctions, adverbs and other parts of speech are categorized. For example, in the case of racist websites, it has been found that the word "they" occurs with high frequency and is a good indicator word for racist websites. Thereafter, the most frequently used words are extracted 23 and the word data is stored 27.

At this stage a user enters category information 25 based upon the category that the user is training the system to recognize. The word information is further arranged to provide information on the word count, category id and the name of the site 29 and this information is stored in a words table 31. In addition, a probability weighting that provides an indication on the likelihood that a combination of words can be ascribed to a specific category is calculated and the probability weighting 33 is input to a category table 35.

Figure 3:
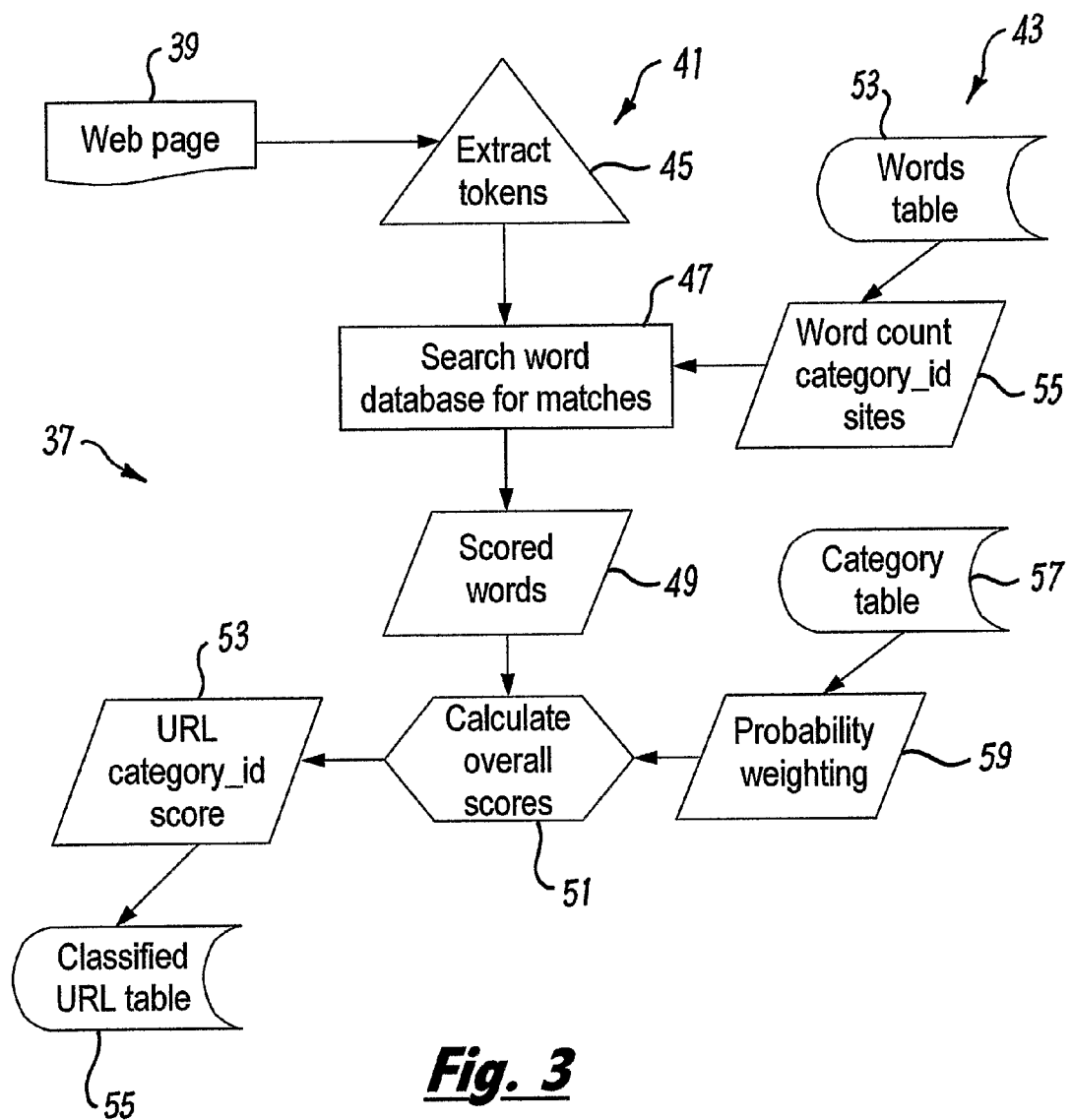
FIG. 3 is a flowchart showing an embodiment of the second aspect of the present invention.

FIG. 3 shows an embodiment of the method of categorizing 37 in accordance with the second aspect of the invention. In this embodiment, information is extracted from the webpage and analyzed (shown generally by reference numeral 41) and is compared with category specific information 43 that has been derived from the manner in which the system was trained or configured to recognize certain categories of website.

A website 39 is automatically selected and information is extracted from the markup language used to describe and define the content of a webpage 45. As described with reference to FIG. 3, the information extracted relates to words or sentences that describe the content of the page. The words table 53 provides information on words, count and various categories 55 and compares this information to the data extracted from the markup language 47. Thereafter, the scored words 49 are identified and the probability weighting 59 from category table 57 is used in conjunction with the scored words information to calculate the overall score 51. A URL category id and score are then provided 53 and the webpage is classified 55. Classification of the webpage typically involves determining whether the overall score is above a threshold value which determines whether the webpage is to be categorized in a particular category. It is possible for a webpage to be contained in more than one category where scores exceed a threshold in more than one category.

Figure 4:
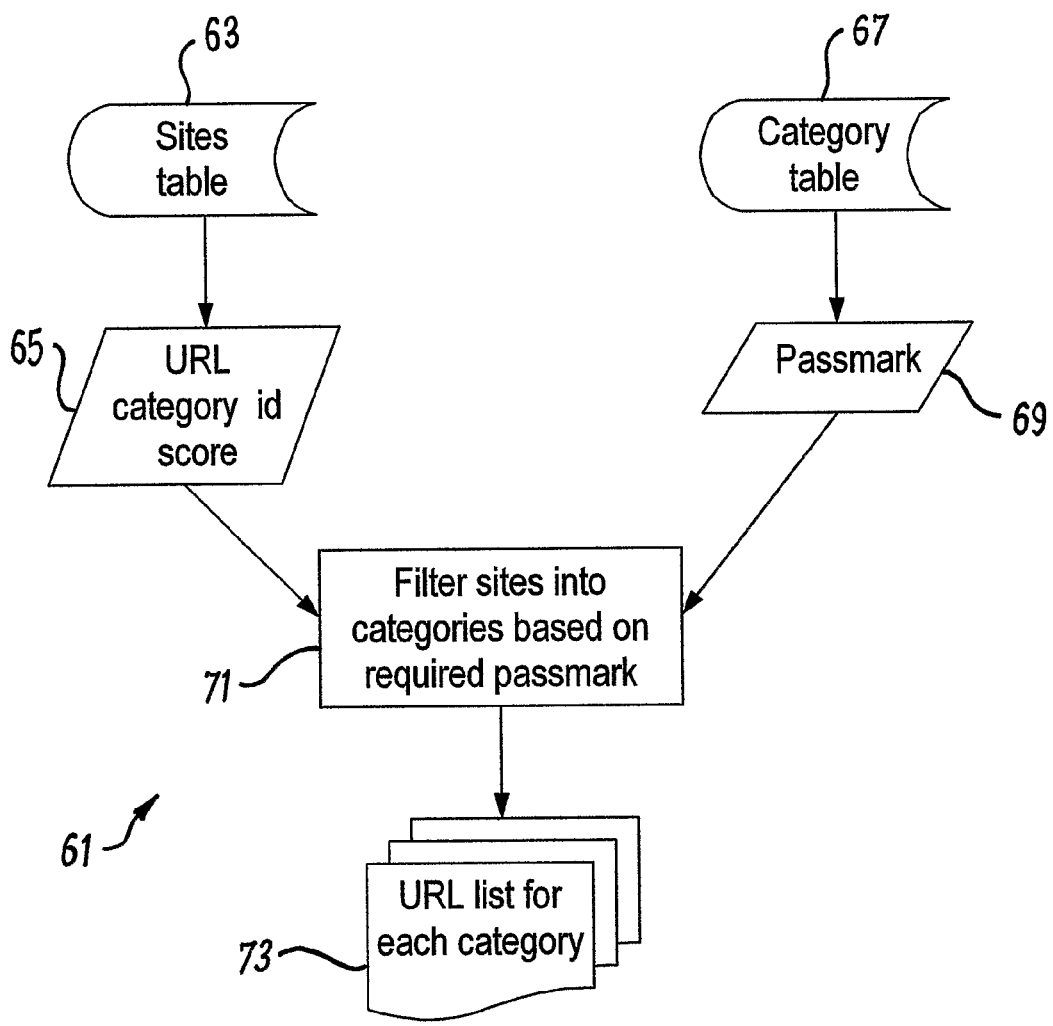
FIG. 4 is a flow chart showing the manner in which websites are retained within a database.

FIG. 4 shows the manner in which URLs are added to categories. The figure shows the sites table 63, URL, category id and score 65, the category table 67 and a pass mark indicator 69. As is shown at reference numeral 71, websites are filtered into categories based on them exceeding a required pass mark or threshold. A database is then constructed in which a url list for each category is stored 73.

Figure 5:
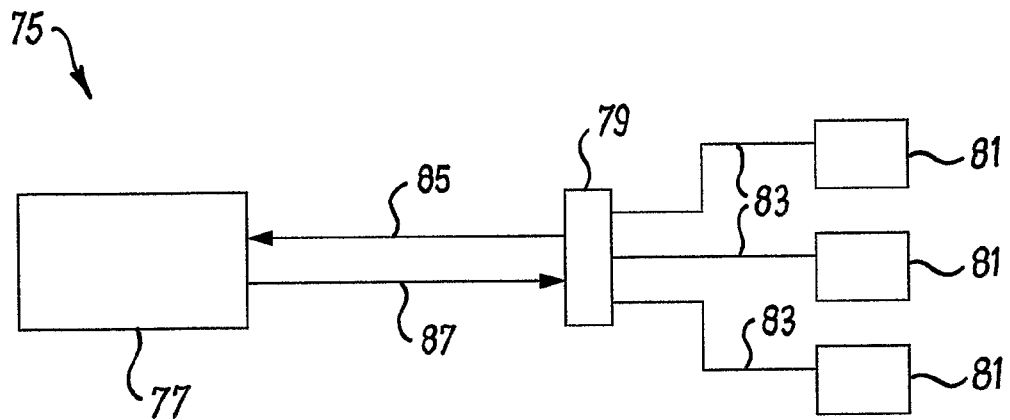
FIG. 5 is an embodiment of a web filtering system in accordance with a fourth aspect of the present invention.

FIG. 5 is an example of a system in accordance with the present invention. The system 75 comprises a database 77 within which categorized websites are contained. Server 79 is the local server at the client or user site which is provided with web filtering software. User workstations 81 are also shown along with communications links 83 between user workstations 81 and server 79 as well as communications links 85 and 87 which allows communication between the database 77 and server 79.

Use of the system will now be described with reference to the flow chart of FIG. 7. After the start of the process 107, the user requests a URL 109 and the system checks URL database 77 (FIG. 5) and access policy 111 to determine whether access is allowed 113. Access may or may not be allowed if the URL is categorized and the user is unable to access that category. Therefore if no access is allowed 117, then the user's terminal screen displays a message stating that access had been denied 141 and the process stops 147. The database that is checked has been compiled in accordance with the automatic classification method of the present invention.

If access appears to be allowed 115, then the system conducts a URL keyword check 119. The URL keyword check calculates a score based on the words contained in the URL and determines whether a threshold 121 is exceeded. If yes 123, then a message informing the user that access has been denied 141 is displayed and the process terminates 147. If no 125, then the request is forwarded to a web server 127 where active page scanning 129 is conducted. If a threshold base 131 based on active page scanning 129 is exceeded then a message is displayed to the user informing him that access has been denied 141. If the threshold is not exceeded 135, then the requested page is displayed 139, thereafter the process stops 147.

Figure 7:
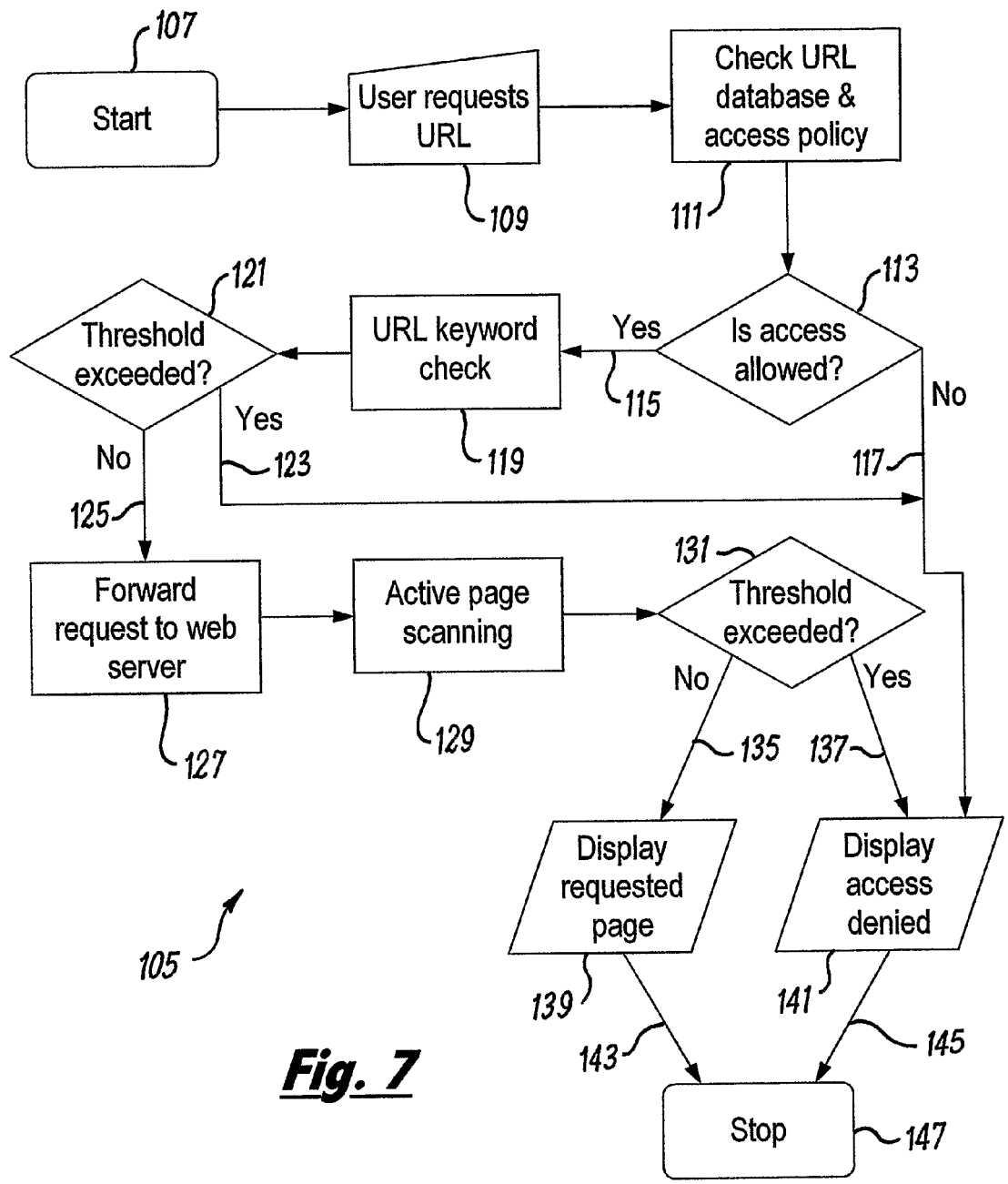
FIG. 7 is a flow chart showing use of a web filtering system in accordance with the fourth aspect of the present invention.

As is apparent, the present invention is used herein to improve the number of URLs contained in the database 77, this greatly improves the reliability of the web filtering process described in FIG. 7. The process in FIG. 7 also contains known web filtering techniques such as URL keyword checking and active page scanning.

Figure 6:
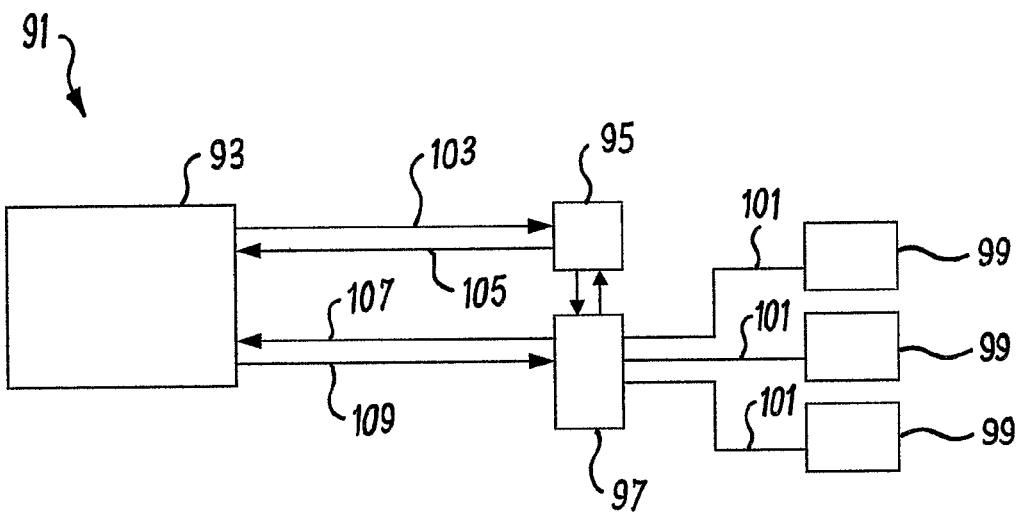
FIG. 6 is an embodiment of a web filtering system in accordance with the fifth aspect of the present invention.

FIG. 6 shows a system in accordance with the present invention and, in particular, with reference to the fifth aspect of the present invention.

The system 91 shows a database 93 attached to a user or client server 97 which contains web filtering software and which further comprises a real time categorization module 95. The real time categorization module 95 operates to categorize websites in accordance with methods of the present invention. The server 97 is connected 101 to user terminals 99. The categorization module 95 is connected via transmission and receiving communication means 105 to the database 93. Similarly, server 97 is connected to database 93 via communication means 107 and 109. A method of operation of a system in accordance with the present invention and thus shown in FIG. 6 will now be described with reference to FIG. 8.

Figure 8:
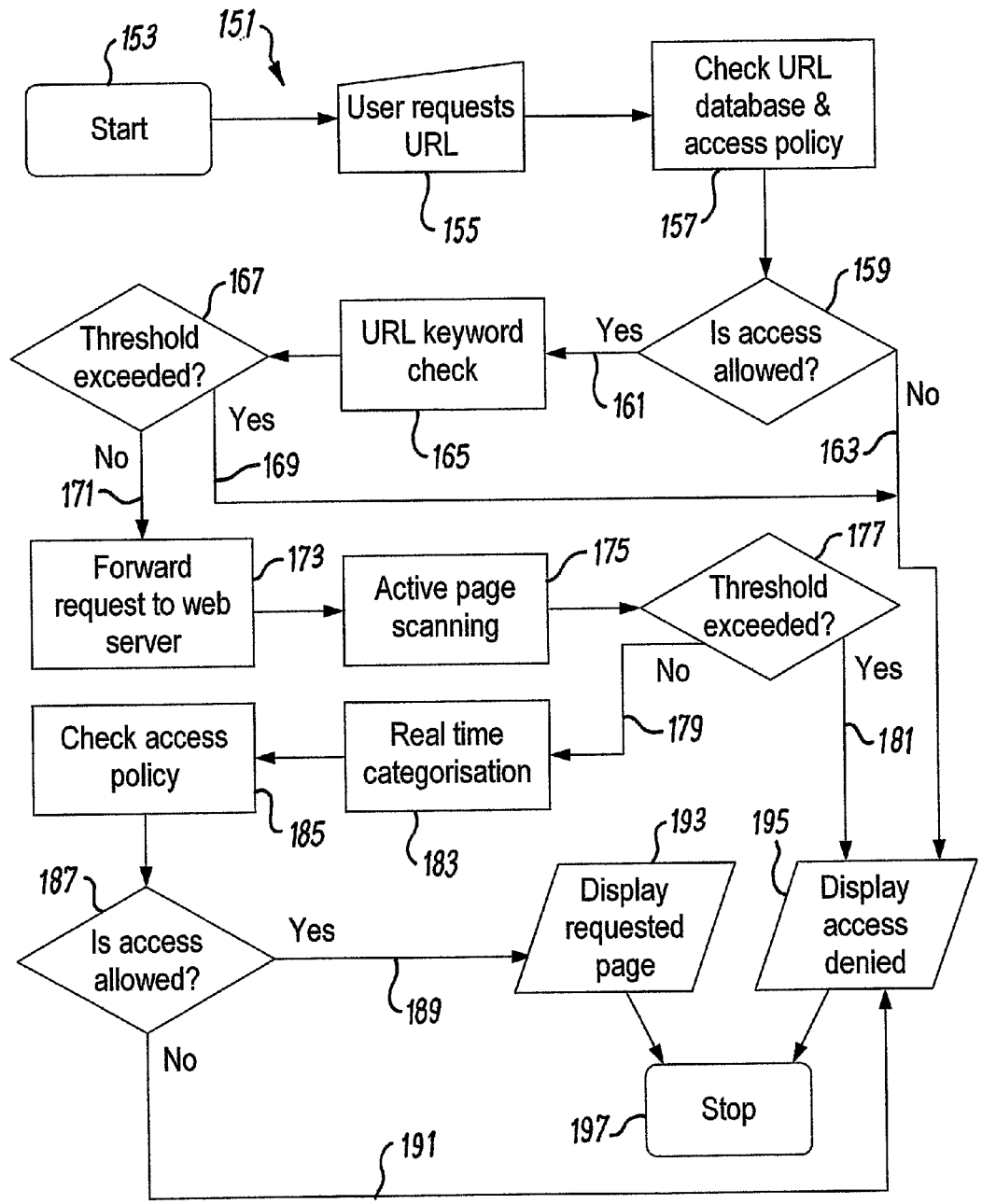
FIG. 8 is a flow diagram showing use of a web filtering system in accordance with the fifth aspect of the present invention.

FIG. 8 is a flow diagram 151 in which a web filtering process is started 153 by a user requesting a URL 155. The URL is checked 157 against the contents of the URL categorization database 93 and the access policy that pertains to the particular user is also checked. The system checks whether access is allowed 159, if no 163 then a message is displayed on the user terminal indicating that access has been denied 195. If at this 3 stage access is allowed 161, then the system undergoes a URL keyword check 165, similar to that described with reference to FIG. 7. A threshold is calculated 167 and if exceeded 169 the user is informed that display access is denied 195. If the threshold is not exceeded 171, then the request is forwarded to the web server 173 where active page scanning 175 is undertaken. If the threshold score for active page scanning 177 is exceeded 181 then display access is denied 195.

If this threshold is not exceeded 179 then the system undergoes real time categorization 183 of the website. This means that the module 95 of the system shown in FIG. 6 analyzes the web page in a manner similar to that shown in FIG. 3. Therefore, this embodiment of the present invention has the capability to filter websites based not only on the contents of a database that is much improved and expanded by the use of the automatic website classification system and method of the present invention but it can also categorize individual websites that have requested by a user.

This is an extremely useful additional feature because user may from time to time have knowledge of websites that are of particular interest to them but which may have not been encountered as yet by an automatic website categorization system. For example, websites that relate to newly released music videos, films or other similar entertainment websites may be well known to fans of that particular type of music or film. In addition the users themselves may be excluded from accessing music or entertainment websites. Accordingly, the present invention provides the very real benefit that the users themselves provide a means for more rapidly updating and including new websites in various categories.

Where this type of situations arises, the real time categorization of the particular website that is unknown to the database is fed back to the database for inclusion in an update of the database. In addition, this information is then provided to all users of the web filtering system.

Once real time categorization 183 has been undertaken, the access policy of the particular user is checked 185 to determine whether the website category in which the website falls is accessible by the user 187. If access is allowed 189 then the page is displayed 193. If access is not allowed 191 then the message indicating that access has been denied to the user is displayed 195. Thereafter, the process terminates 197.

Improvements and modifications may be incorporated herein without deviating from the scope of the invention.

The invention claimed is:

1. A method for configuring website categorization software to automatically categorize websites from a predetermined category of website, the method comprising:
   identifying a website from a predetermined category;
   reading a markup language description of the website;
   extracting page content information from the markup language description, wherein extracting page content includes identifying words or sentences that describe content of the website;
   analyzing the page content information, wherein analyzing the page content information includes analyzing the identified words or sentences that describe the content of the website and identifying the frequency of each word in the words or sentences that describe the website content;
   repeating the steps above for a number of websites in the predetermined category;
   creating a profile for the website category based upon a combination of results from analyzing the page content information of the number of websites, wherein creating the profile includes storing, in a words table that is part of the profile, information regarding the most frequently used words from the identified frequency of each word in the words or sentences that describe the website content, the information regarding the most frequently used words including a word count;
   receiving input regarding a category that the software is being trained to recognize;
   storing, as part of the profile, an identifier for the category;
   storing, as part of the profile, a website identifier for each of the number of websites;
   producing a pattern of words that categorize the category; and
   storing, as part of the profile, a probability weighting that the pattern of words can be ascribed to the category.

2. The method according to claim 1, wherein analyzing the page content comprises analyzing text or tokens on the page.

3. The method according to claim 2, wherein analyzing text on the page comprises counting a frequency of use of different words on the page.

4. The method according to claim 3, wherein the frequency of use of all words is counted.

5. The method according to claim 1, wherein analyzing the page content comprises extracting a predetermined number of most frequently used words.

6. The method according to claim 1, wherein a pattern of use of the most frequently used words is analyzed.

7. A method of categorizing a website, the method comprising:
   identifying the website;
   reading a markup language description of the website;
   extracting page content information from the markup language description;
   comparing the page content information with a plurality of website category profiles; and
   categorizing the website on the basis of a degree of similarity between the plurality of website category profiles and the extracted page content information, wherein each of the website category profiles is created by a method for configuring website categorization software to automatically categorize websites from a predetermined category of website, the method for configuring website categorization software comprising:
   identifying a website from a predetermined category;
   reading a markup language description of the website;
   extracting page content information from the markup language description, wherein extracting page content includes identifying words or sentences that describe content of the website;
   analyzing the page content information, wherein analyzing the page content information includes analyzing the identified words or sentences that describe the content of the website and identifying the frequency of each word in the words or sentences that describe the website content;
   repeating the steps above for a number of websites in the predetermined category;
   creating a profile for the website category based upon a combination of results from analyzing the page content information of the number of websites, wherein creating the profile includes storing, in a words table that is part of the profile, information regarding the most frequently used words from the identified frequency of each word in the words or sentences that describe the website content, the information regarding the most frequently used words including a word count;
   receiving input regarding a category that the software is being trained to recognize;
   storing, as part of the profile, an identifier for the category;
   storing, as part of the profile, a website identifier for each of the number of websites;
   producing a pattern of words that categorize the category; and
   storing, as part of the profile, a probability weighting that the pattern of words can be ascribed to the category.

8. The method according to claim 7, wherein comparing the page content comprises analyzing the tokens or words on the page.

9. The method according to claim 8, wherein analyzing the words on the page comprises counting a frequency of use of different words on the page.

10. The method according to claim 9, wherein the frequency of use of all words is counted.

11. The method according to claim 9, wherein a pattern of use of the most frequently used words is analyzed.

12. The method according to claim 7, wherein comparing the page content comprises extracting a predetermined number of most frequently used words.

13. The method according to claim 7, further comprising applying the probability weighting to a word or combination of words on the page, the probability weighting providing a likelihood that a word or combination of words is to be found on a predetermined category of website.

14. A method of controlling access to a website requested by a user, the method comprising:
   comparing a website identifier with a database containing website identifiers in which the website identifiers are arranged in categories, using a method for categorizing a website, the method for categorizing a website comprising:
identifying the website;
reading a markup language description of the website;
extracting page content information from the markup language description;
comparing the page content information with a plurality of website category profiles; and
categorizing the website on the basis of a degree of similarity between the plurality of website category profiles and the extracted page content information, wherein each of the website category profiles is created by a method for configuring website categorization software to automatically categorize websites from a predetermined category of website, the method for configuring website categorization software comprising:
identifying a website from a predetermined category;
reading a markup language description of the website;
extracting page content information from the markup language description, wherein extracting page content includes identifying words or sentences that describe content of the website;
analyzing the page content information, wherein analyzing the page content information includes analyzing the identified words or sentences that describe the content of the website and identifying the frequency of each word in the words or sentences that describe the website content;
repeating the steps above for a number of websites in the predetermined category;
creating a profile for the website category based upon a combination of results from analyzing the page content information of the number of websites, wherein creating the profile includes storing, in a words table, information regarding the most frequently used words from the identified frequency of each word in the words or sentences that describe the website content, the information regarding the most frequently used words including a word count;
receiving input regarding a category that the software is being trained to recognize;
storing, as part of the profile, an identifier for the category;
storing, as part of the profile, an identifier for each of the number of websites;
producing a pattern of words that categorize the category; and
storing, as part of the profile, a probability weighting that the pattern of words can be ascribed to the category; and
granting or denying access to the website on the basis of the presence or absence of the website identifier in the database.

15. A system for controlling access to websites, the system comprising:
a database containing website identifiers in which the website identifiers are arranged in categories using a method for categorizing a website, the method comprising:
identifying the website;
reading a markup language description of the website;
extracting page content information from the markup language description;
comparing the page content information with a plurality of website category profiles; and
categorizing the website on the basis of a degree of similarity between the plurality of website category profiles and the extracted page content information, wherein each of the website category profiles is created by a method for configuring website categorization software to automatically categorize websites from a predetermined category of website, the method for configuring website categorization software comprising:
identifying a website from a predetermined category;
reading a markup language description of the website;
extracting page content information from the markup language description, wherein extracting page content includes identifying words or sentences that describe content of the website;
analyzing the page content information, wherein analyzing the page content information includes analyzing the identified words or sentences that describe the content of the website and identifying the frequency of each word in the words or sentences that describe the website content;
repeating the steps above for a number of websites in the predetermined category;
creating a profile for the website category based upon a combination of results from analyzing the page content information of the number of websites, wherein creating the profile includes storing, in a words table, information regarding the most frequently used words from the identified frequency of each word in the words or sentences that describe the website content, the information regarding the most frequently used words including a word count;
receiving input regarding a category that the software is being trained to recognize;
storing, as part of the profile, an identifier for the category;
storing, as part of the profile, a website identifier for each of the number of websites;
producing a pattern of words that categorize the category; and
storing, as part of the profile, a probability weighting that the pattern of words can be ascribed to the category; and
a communicator that transmits a website identifier requested by a user to the database;
a server computer including a comparator that compares the website identifier requested by the user with the contents of the database such that access to the website is granted or denied on the basis of the presence or absence of the website identifier in the database.

16. A system for controlling access to websites, the system comprising:
a database containing website identifiers in which the website identifiers are arranged in categories;
a communicator that transmits a website identifier requested by a user to the database;
a server computer including a comparator that compares the website identifier requested by the user with the contents of the database such that access to the website is denied on the basis of the presence of the website identifier in the database the server further including computer software configured to categorize the website by:
identifying the website;
reading a markup language description of the website;
extracting page content information from the markup language description;
comparing the page content information with a plurality of website category profiles; and categorizing the website on the basis of a degree of similarity between the plurality of website category profiles and the extracted page content information, wherein each of the website category profiles is created by a method for configuring website categorization software to automatically categorize websites from a predetermined category of website, the method for configuring the website categorization software comprising:

identifying a website from a predetermined category;

reading a markup language description of the website;

extracting page content information from the markup language description, wherein extracting page content includes identifying words or sentences that describe content of the website;

analyzing the page content information, wherein analyzing the page content information includes analyzing the identified words or sentences that describe the content of the website and identifying the frequency of each word in the words or sentences that describe the website content;

repeating the steps above for a number of websites in the predetermined category;

creating a profile for the website category based upon a combination of results from analyzing the page content information of the number of websites, wherein creating the profile includes storing, in a words table that is part of the profile, information regarding the most frequently used words from the identified frequency of each word in the words or sentences that describe the website content, the information regarding the most frequently used words including a word count;

receiving input regarding a category that the website categorization software is being trained to recognize;

storing, as part of the profile, an identifier for the category;

storing, as part of the profile, an identifier for each of the number of websites;

producing a pattern of words that categorize the category; and storing, as part of the profile, a probability weighting that the pattern of words can be ascribed to the category; and wherein when the website identifier requested by the user is not in the database, the server is configured to categorize the website and to grant or deny the user access to the website on the basis of the categorization.

* * * * *